United States Patent [19]
Barger

[11] Patent Number: 5,826,864
[45] Date of Patent: Oct. 27, 1998

[54] ACTIVE VIBRATION MOUNT

[75] Inventor: James E. Barger, Winchester, Mass.

[73] Assignee: GTE Internetworking Incorporated, Cambridge, Mass.

[21] Appl. No.: 806,779

[22] Filed: Feb. 26, 1997

[51] Int. Cl.$^6$ ....................................... F16M 1/00
[52] U.S. Cl. ..................... 267/136; 188/378; 248/550
[58] Field of Search .................. 267/136, 140.14, 267/141.1; 188/267, 378, 379; 73/660; 248/550, 638, 562, 636; 318/646, 647, 650, 687; 180/300, 312

[56] References Cited

U.S. PATENT DOCUMENTS

| | | | |
|---|---|---|---|
| 5,000,415 | 3/1991 | Sandercock | 248/550 |
| 5,052,529 | 10/1991 | Sutcliffe et al. | 267/136 X |
| 5,229,979 | 7/1993 | Scheinbeim et al. | |
| 5,660,255 | 8/1997 | Schubert et al. | 267/136 X |

*Primary Examiner*—Lee W. Young
*Attorney, Agent, or Firm*—Leonard C. Suchyta

[57] ABSTRACT

The active vibration mount disclosed herein employs a multiplicity of layers of an electro-strictive material such as an electro-strictive polyurethane film interleaved with electrodes. A majority of the layers are employed as an output transducer while at least one layer is employed as a sensor generating a force-induced voltage. Accordingly, a feedback controller responsive to that voltage can energize the output transducer thereby to reduce the vibratory force transmitted through the mount over a preselectable range of frequencies while the mount supports a static load.

19 Claims, 3 Drawing Sheets

ACTIVE VIBRATION MOUNT

BACKGROUND OF THE INVENTION

The present invention relates to resilient vibration isolation mounts and more particularly to such a mount which is electro-active and can be energized by a controller to reduce the vibratory force transmitted through the resilient mount over a preselectable band of frequencies while the resilient mount supports a static load. As is understood, there is an increasing interest in controlling or reducing noise and vibration by active means, i.e., feedback controllers which energize a transducer so as to generate a cancelling noise or vibration. Such controllers typically utilize adaptive filters which are implemented digitally. The practicality and cost effectiveness of such controllers has been advanced by the availability of digital signal processors whose capabilities have advanced in correspondence with the advances in microelectronics generally.

While various active vibration isolation mounts have been proposed in the prior art e.g., U.S. Pat. Nos. 3,606,233, 4,600,863 and 5,052,510, such mounts have not been widely adopted due to their high cost and cumbersome nature. By and large the problems confronted are associated with the sensing and driving transducers which are necessary to implement a practical active vibration or noise control system. Typically, separate transducers have been required for both sensing and for generating the feedback forces. Further, these transducers have usually been separate from the resilient mount which supports the static load, e.g., the weight of the machinery which is generating the vibration.

Among the several objects of the present invention may be noted that the provision of a novel electro-active vibration isolation mount; the provision of such a mount in which an output transducer is integrated with the resilient elements which can support a static load; the provision of such a mount which incorporates a sensing means; the provision of such a mount in which a sensing transducer and an output transducer are effectively combined and integrated; the provision of such a mount which can be energized to effectively reduce the vibratory force transmitted through the mount over a pre-selectable band of frequencies; the provision of such a mount which will support a substantial static load; the provision of such a mount which is easily fabricated; the provision of such a mount which is highly reliable and which is of relatively simple and inexpensive construction. Other objects and features will be in part apparent and in part pointed out hereinafter.

SUMMARY OF THE INVENTION

An electro-active vibration mount constructed in accordance with the present invention employs a multiplicity of layers of an electro-strictive polyurethane film. Interleaved with a first plurality of the film layers are a plurality of electrodes, alternating ones of which are connected in common to respective input leads. Another pair of electrodes are provided on opposite sides of at least one additional layer of the film with those electrodes being connected to respective output leads. Accordingly, a feedback controller responsive to a force-induced voltage generated on the output leads can energize the first plurality of layers through the input leads to reduce the vibratory force transmitted through the mount over a preselectable band of frequencies.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
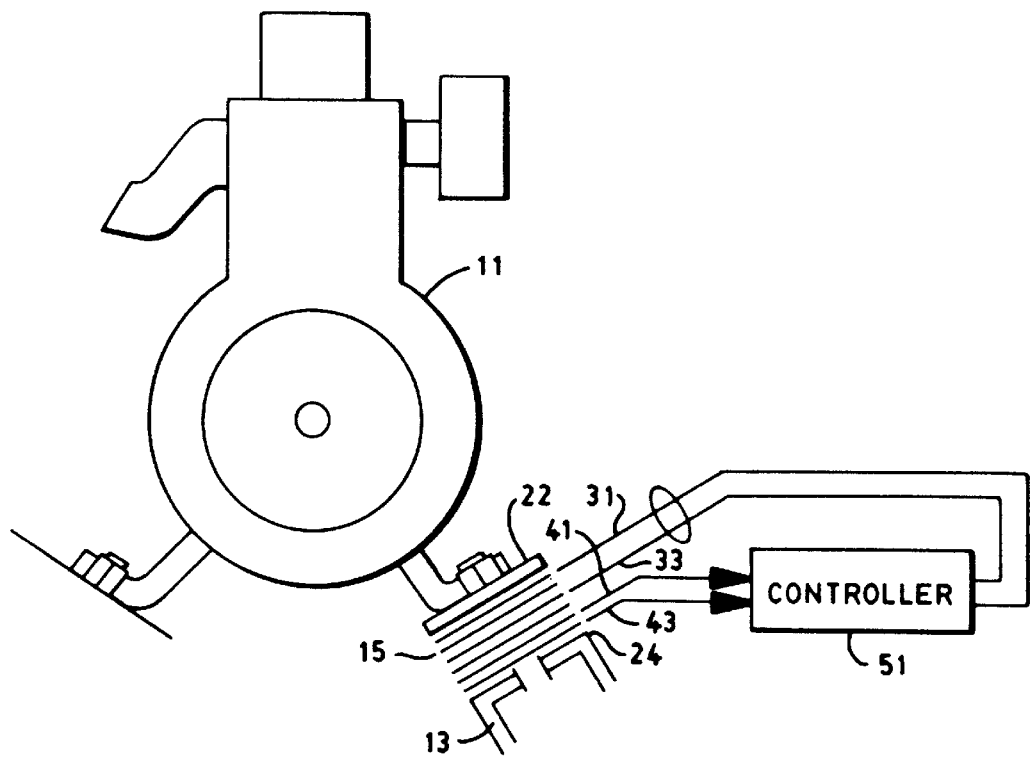
FIG. 1 is a diagram illustrating a diesel engine provided with active vibration isolating mounts in accordance with the present invention.

Referring now to FIG. 1, a diesel engine 11 is mounted on a bed or foundation 13 through a series, typically four, of compliant vibration isolation mounts 15 constructed in accordance with the present invention. It is an advantage of the construction of the mounts of the present invention that they may be substituted relatively easily for the more usual rubber, metal, or pneumatic passive mounts which are typically employed for mounting a vibration producing piece of machinery such as a diesel engine.

Figure 2:
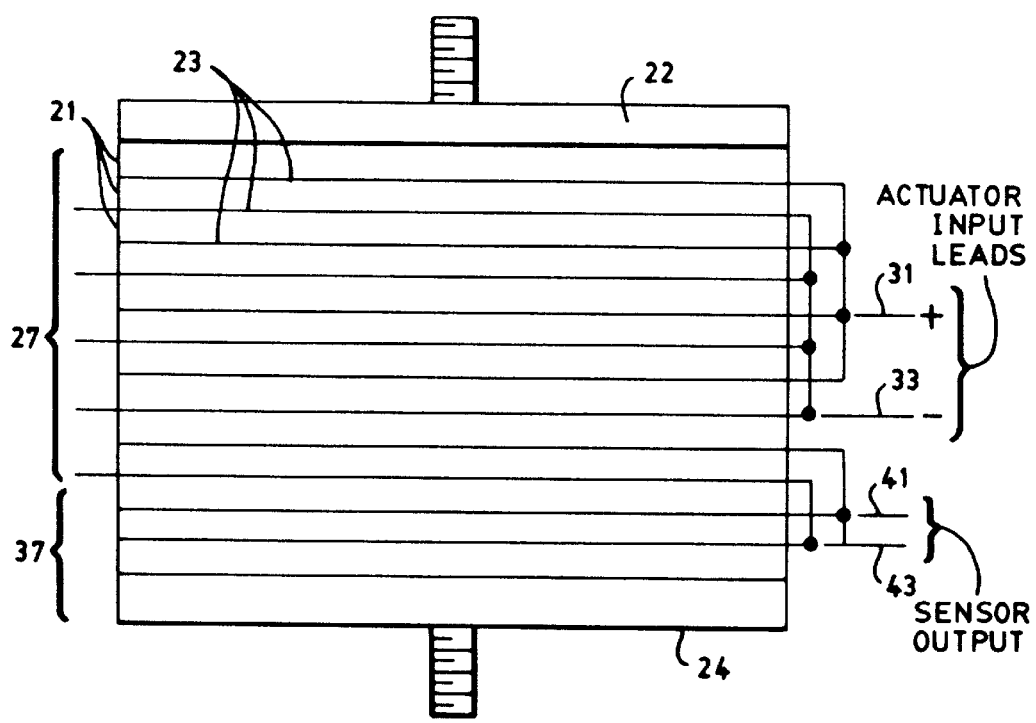
FIG. 2 is a diagram of one of the mounts employed in the arrangement of FIG. 1.

Referring now to FIG. 2 where the layers are shown in enlarged thickness for purposes of illustration, mount 15 can be seen to comprise a multiplicity of layers 21 of an electro-strictive polyurethane film. While polyurethane films are in general electro-strictive, a presently preferred type of film is that manufactured by DOW Corporation and designated by its type no. 2103-80AE. Interleaved with the film layers are a plurality of electrodes 23. The preferred manner of constructing this interleaved construction is described in greater detail hereinafter. The film and electrode layers are adhesively mounted between a pair of conventional end plates 22 and 24 carrying conventional mounting studs. The film layers are sufficiently strong to support the weight of the engine 11 i.e., the static preload without significant distortion.

As indicted previously a majority of the electro-strictive polyurethane layers 21 are employed as an output transducer. In FIG. 2 this plurality of layers is designated generally by reference character 27. Alternating ones of the electrodes 23 interleaved in this group of film layers are connected in common to respective ones of a pair of input leads 31 and 33.

A second, smaller grouping of layers, designated generally by reference character 37, are employed as a sensing transducer. While, in theory, a single additional layer of the film could be employed as such a sensor, it is presently preferred to employ a smaller grouping of the film layers. Alternating ones of the interleaved electrodes 23 in the second grouping are connected to respective output leads 41 and 43 as indicated.

As indicated previously, the polyurethane film material is electro-strictive. Accordingly, by applying a voltage to the input leads 31 and 33, a strain or displacement can be developed between the end plates 22 and 24. With the preferred polyurethane material identified, this strain can approach 1% of the height of the energized layers, i.e., in the plurality of layers 27. Preferably, as described hereinafter, the output transducer position of the mount is energized by means of a controller-generated a.c. voltage superimposed upon a d.c. bias voltage so that displacement is an approximately linear function of the a.c. control voltage.

A d.c. bias voltage is also applied across the output leads 41 and 43. Thus, when a vibratory force or strain is applied to the second group of film layers 37, an a.c. voltage will be produced across the output leads 41 and 43. This second grouping of film layers can thus be utilized as a sensor in a feedback controlling scheme as described in greater detail hereinafter. Since the basic construction of the sensing portion of the mount is essentially the same as the output transducer portion of the mount, it can be seen that the two capabilities are easily integrated in a single structure. Further, since the polyurethane material itself is inherently fairly compliant e.g., it has a modulus of about $10^7$ Pa, each mount 15 can also function to a substantial extent as a passive vibration isolation mount for vibratory frequencies outside the operating frequency band of the controller.

The force responsive a.c. voltage generated on the output leads 41 and 43 is applied as an input signal to a controller 51. Controller 51 is preferably adaptive and may, for example, be of the general type characterized as a feedback controller which, within a preselectable band frequencies, energizes the output transducer i.e., the film layers in grouping 27, so as to reduce the vibratory force transmitted through the mount. In one sense, the operation of the controller may be understood to effect an activation of the mount which dynamically increases its compliance within the frequency band of operation so that vibratory forces transmitted through the mount are effectively reduced by the loop gain of the controller. While a separate control loop could be provided for each of the several mounts 15, it is generally preferable that a so called multiple input multiple output (MIMO) controller be utilized which takes into account and adjusts for the cross-coupling between the several mounts. Likewise, while a pure feedback controller may be utilized, it may also be advantageous in certain situations to implement a so-called feed-forward control system which utilizes, as an input, a tachometer or other timing signal derived from the machinery creating the vibration. In such a case the sensing component of the active mount operates as an error signal, again providing feedback but in a feed-forward context. As indicated previously, controllers of these various types, digitally implemented, are known in the art.

Figure 3:
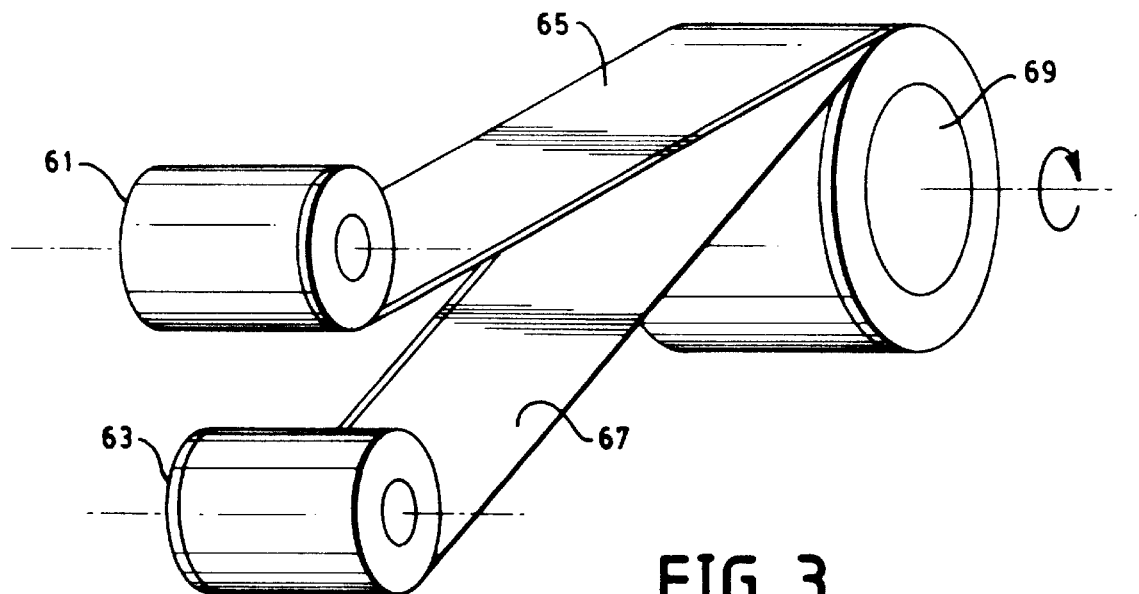
FIGS. 3 and 4 are diagrams illustrating one manner in which the components of the mount of FIG. 2 can be fabricated.
Figure 4:
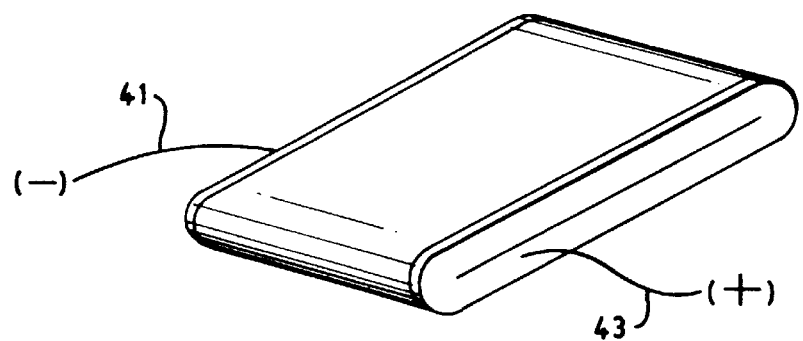

The preferred method of assembling the multi-layered mounts of the present invention is basically similar to the technique commonly employed for manufacturing plastic film capacitors though polyurethane film would not be appropriate for use as capacitor for a variety of reasons. This basic technique is illustrated in FIGS. 3 and 4. From respective supply rolls, 61 and 63, are drawn strips 65 and 67 of polyurethane film. Each of the strips carries a deposited electrode which covers one face of the strip except for a margin along one side, the uncoated margins being on opposite sides of the two strips. The strips are wound on a mandrel 69 to provide the interleaving of the electrodes with film layers. The wound cylinder is then removed from the mandrel and flattened to provide the flat layered arrangement illustrated in FIG. 4. It is typically not necessary to remove the rounded end portions. The ends of the flattened cylinder are then sprayed with a suitable metal to conductively connect all of the similar electrodes in common to a respective lead. The output transducer portion of the mount will typically be made up of a plurality of the flattened cylinders while the sensing portion will be made up of a single such flattened cylinder.

Figure 5:
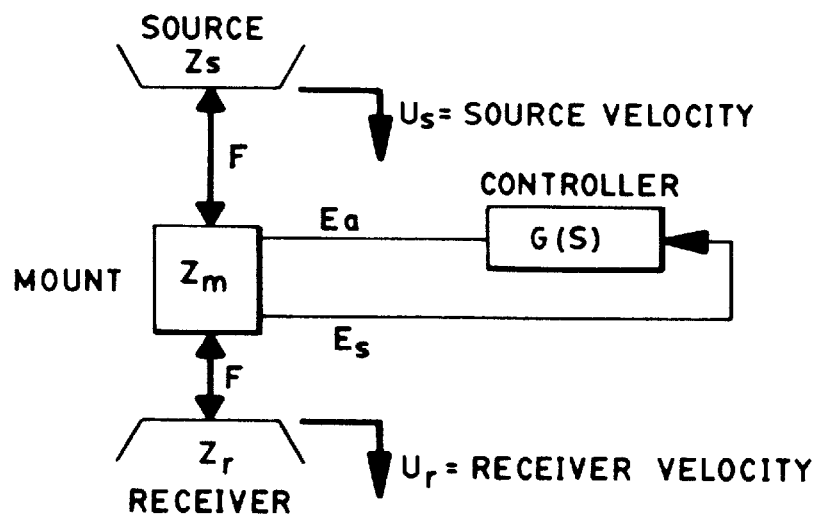
FIG. 5 illustrates components of the system separated for mathematical analysis.

The characteristics for a suitable controller can be derived in the following manner. With reference to the Diagram of FIG. 5, the forces, velocities and voltages present in the system can be defined as follows:

$$F = \Psi E_c + Z_m(U_s - U_r)$$

$$U_s = U_o - F/Z_s$$

$$U_r = F/Z_r$$

$$E_{ms} = KF$$

$$E_c = -G_1 E_{ms} + G_2 E_{ff}$$

where $\Psi$ = Transformation Factor

F = Force exerted by activator

Z = Mechanical Impedance [s=source, m=mount, r=receiver/foundation]

U = Velocity [s=source, r=receiver/foundation]

$U_o$ = Source "free" velocity—i.e., the absence of the activator load.

E = Voltage [ms=sensor, c=control, ff=feed forward]

Substituting successively into the force equation yields the following:

$$F = -\Psi G_1 E_{ms} + \Psi G_2 E_{ff} + Z_m(U_s - U_r)$$

$$F = -\Psi G_1 KF + Z_m(U_o - F/Z_s - F/Z_r) + \Psi G_2 E_{ff}$$

$$F = -\Psi G_1 KF - (Z_m/Z_s)F - (Z_m/Z_r)F + Z_m U_o + \Psi G_2 E_{ff}$$

$$F[1 + Z_m/Z_s + Z_m/Z_r + \Psi G_1 K] = Z_m U_o + \Psi G_2 E_{ff}$$

Figure 6:
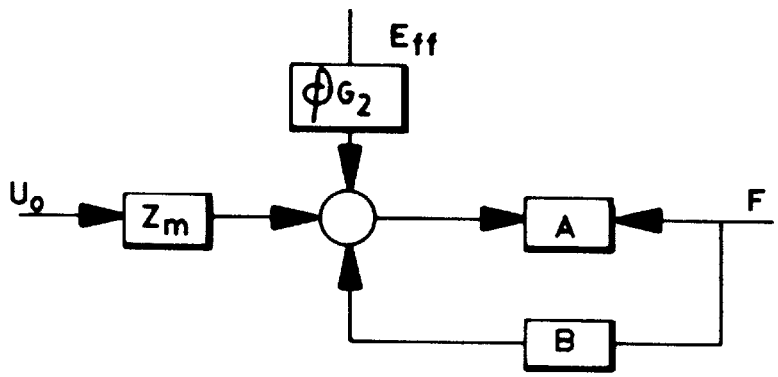
FIG. 6 illustrates a typical controller configuration.
Figure 7:
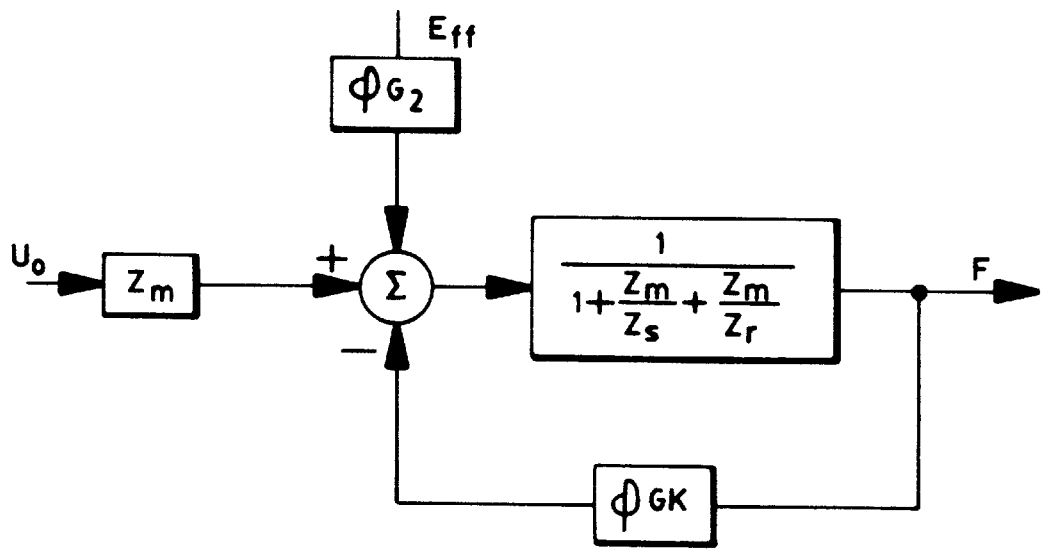
FIG. 7 illustrates a controller providing characteristics particularly adapted for use in the systems illustrated in FIG. 1.

A generalized controller is illustrated FIG. 6 and substituting into the generalized components values derived from the above equations in the following manner $$\frac{F}{Z_m U_o} = \frac{A}{1 + AB} = \frac{1}{A^{-1} + B}$$

$$\therefore A^{-1} = 1 + Z_m/Z_s - Z_m/Z_r$$

$$B = \Psi GK$$

yields a controller as illustrated in FIG. 7.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An electro-active vibration mount comprising
a plurality of layers of an electro-strictive material;
a plurality of electrodes interleaved with said plurality of electro-strictive material layers;
wherein a first grouping of said plurality of layers and electrodes is adapted to reduce vibrating energy being transmitted through said mount over a preselectable band of frequencies while said mount supports a static load; and
wherein a second grouping comprising at least one of said plurality of layers and at least two of said plurality of electrodes is adapted to provide an output representative of a force being applied to said at least one layer.

2. The electro-active vibration mount of claim 1, wherein the electro-strictive material is an electro-strictive polyurethane film.

3. The electro-active vibration mount of claim 1, wherein said first grouping of electro-strictive material layers are adapted to reduce the vibrating energy transmitted through said mount by application of a voltage to said first grouping of said plurality of electrodes.

4. The electro-active vibration mount of claim 3, wherein a voltage is imposed in said second grouping of electrodes responsive to application of the force to said at least one second grouping electro-strictive material layer.

5. The electro-active vibration mount of claim 1, further comprising a pair of input leads, alternating ones of said plurality of electrodes of said first grouping being connected in common to respective ones of said leads and a pair of output leads being interconnected to said at least two electrodes of second grouping.

6. The electro-active vibration mount of claim 2, wherein a generated a.c. voltage superimposed upon a d.c. bias voltage is applied to said first grouping electrodes to reduce the transmission of vibratory energy through said mount.

7. The electro-active vibration mount of claim 6, wherein the generated a.c. voltage is adjusted responsive to the output from said second grouping.

8. The electro-active vibration mount of claim 1, wherein said second grouping further includes a plurality of electro-strictive material layers and a plurality of electrodes interleaved with said plurality of electro-strictive material layers.

9. A system for reducing transmission of vibratory energy, comprising at least one electro-active vibration mount and a controller; wherein each of said at least one vibration mount includes first and second portions configured to support a static load; wherein said first portion of each vibration mount includes:

a plurality of layers of an electro-strictive material;

a plurality of electrodes interleaved with said plurality of electro-strictive material layers; and wherein said plurality of electro-strictive material layers are adapted to reduce the vibrating energy transmitted through said at least one vibration mount over a preselectable band of frequencies when energized;

wherein said second portion of each vibration mount includes:

at least one layer of the electro-strictive material superimposed on said first portion;

at least a pair of electrodes disposed on opposing sides of said at least one electro-strictive material layer; and wherein said at least one second portion electro-strictive material layer is adapted so as to impose a voltage in said second portion electrodes responsive to application of a force to said at least one electro-strictive material layer;

and wherein said controller energizes said first portion electro-strictive layers to reduce transmission of vibratory energy responsive to the force-induced voltage being imposed in said second section electrodes.

10. The system for reducing transmission of vibratory energy of claim 9, wherein the electro-strictive material of said first and second portions is an electro-strictive polyurethane film.

11. The system for reducing transmission of vibratory energy of claim 9, further comprising a pair of input leads, alternating ones of said first portion electrodes being connected in common to respective ones of said leads, a pair of output leads being interconnected to said at least one pair of second portion electrodes, and wherein said input leads and said output leads are interconnected to said controller.

12. The system for reducing transmission of vibratory energy of claim 9, wherein an a.c. voltage superimposed upon a d.c. bias voltage is generated by said controller and applied to said first portion electrodes to reduce the transmission of vibratory energy.

13. The system for reducing transmission of vibratory energy of claim 12, wherein the generated a.c. voltage is adjusted by said controller responsive to the voltage being imposed in said second portion electrodes.

14. The system for reducing transmission of vibratory energy of claim 9, wherein said second portion of each said at least one vibration mount further includes a plurality of electro-strictive material layers and a plurality of electrodes interleaved with said plurality of electro-strictive material layers.

15. The system for reducing transmission of vibratory energy of claim 9, further comprising a plurality of electro-active vibration mounts.

16. The system for reducing transmission of vibratory energy of claim 15, wherein said controller is a multiple input multiple output (MIMO) controller that applies a voltage to said first portion electrodes of each vibration mount and that adjusts the voltage being applied to said first portion electrodes of each vibration mount to adjust for cross-coupling between said plurality of vibration mounts.

17. An electro-active vibration mount comprising:

a first plurality of layers of an electro-strictive polyurethane film;

interleaved with said film layers, a first plurality of electrodes;

a pair of input leads, alternating ones of said electrodes being connected in common to respective ones of said leads;

at least one additional layer of said film, superimposed on said first plurality of layers; and a pair of electrodes on opposite sides of said additional layer connected to respective output leads.

18. The electro-active vibration mount of claim 17, further comprising a feedback controller, responsive to a force-induced voltage generated on said output leads, that energizes said first plurality of layers through said input leads to reduce the vibrating force transmitted through said mount over a preselectable band of frequencies while the mount supports a static load.

19. The electro-active vibration mount of claim 17, wherein a second plurality of layers are superimposed on said first plurality of layers, wherein a plurality of electrodes are interleaved with said second plurality of layers, and wherein alternating ones of sid plurality of electrodes are connected in common to respective ones of said output leads.

* * * * *